Figure 1:
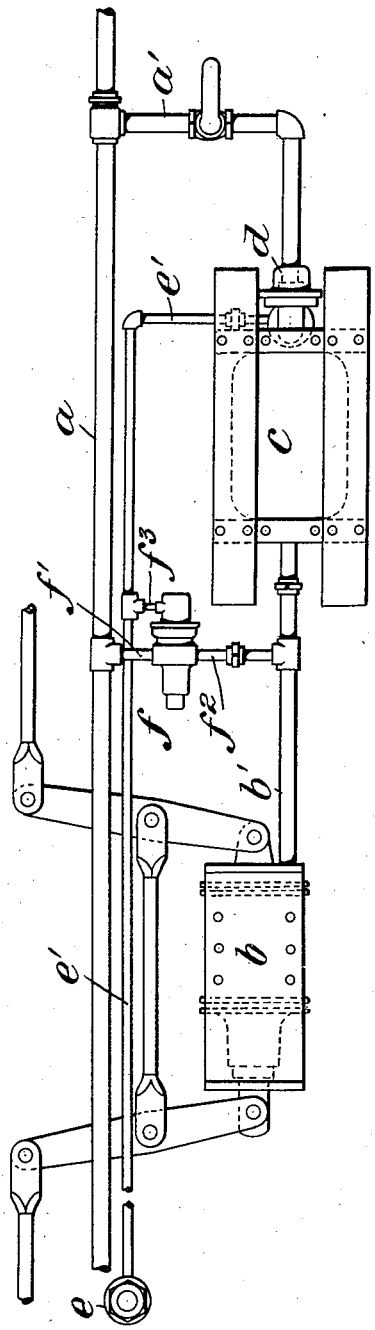

W. H. SAUVAGE.
FLUID PRESSURE BRAKE SYSTEM.
APPLICATION FILED MAR. 16, 1911.

1,012,720.

Patented Dec. 26, 1911.
2 SHEETS—SHEET 1.

Attest:

Inventor:
William H. Sauvage
by Redding, Greeley & Austin
Attys.

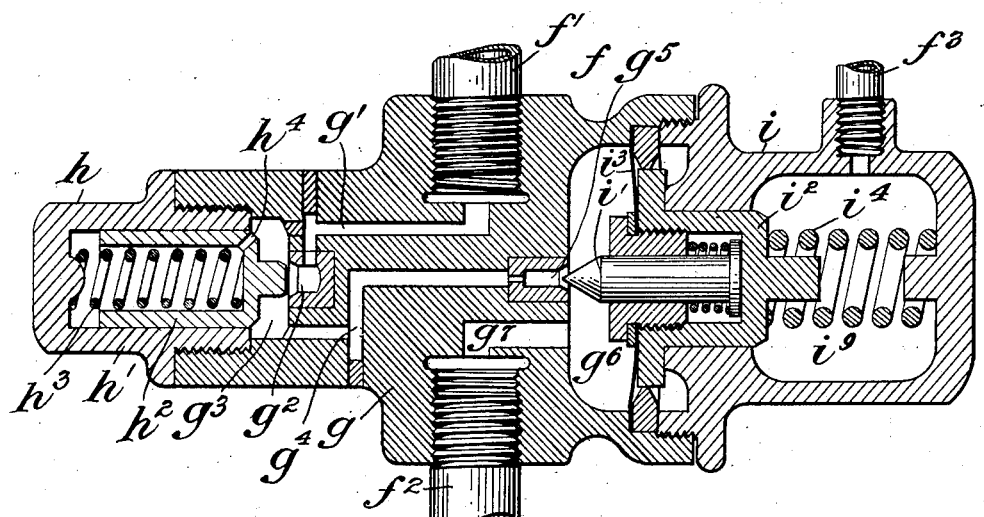
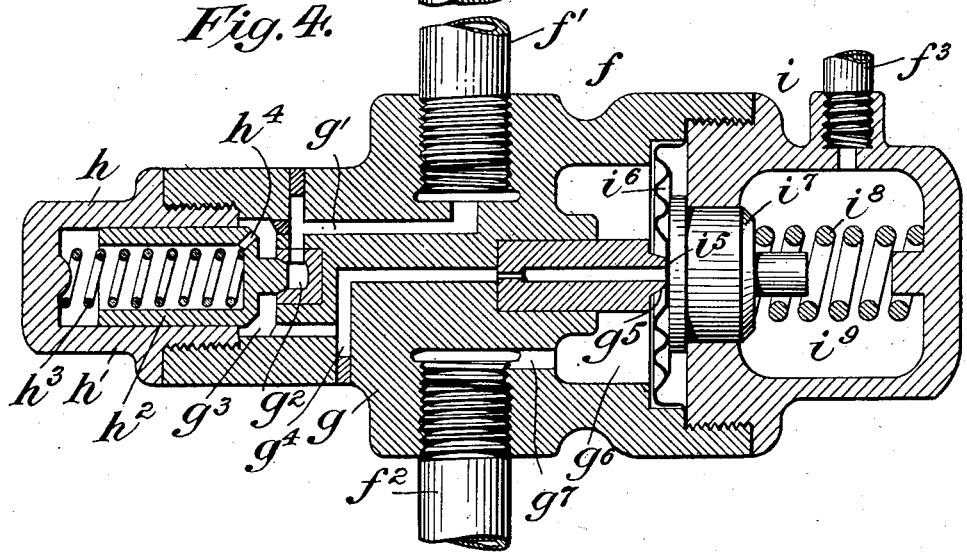

UNITED STATES PATENT OFFICE.

WILLIAM H. SAUVAGE, OF NEW YORK, N. Y.

FLUID-PRESSURE-BRAKE SYSTEM.

1,012,720. Specification of Letters Patent. Patented Dec. 26, 1911.

Application filed March 16, 1911. Serial No. 614,889.

*To all whom it may concern:*

Be it known that I, WILLIAM H. SAUVAGE, a citizen of the United States, residing in the borough of Manhattan of the city of New York, in the State of New York, have invented certain new and useful Improvements in Fluid-Pressure-Brake Systems, of which the following is a specification, reference being had to the accompanying drawings, forming a part hereof.

In another application for Letters Patent of the United States, Serial No. 572,768, filed July 19, 1910, there is shown and described a fluid pressure brake system in which there is interposed in the connection between the train pipe and the brake cylinder a differential valve subject to the pressure in the train pipe to be opened thereby so that the excess of pressure in the train pipe, above the differential pressures at which the differential valve opens (determined by the adjustment of the spring which tends to close the valve against the train pipe pressure), is admitted to the brake cylinder for the purpose of keeping up the brake cylinder pressure. Obviously the pressure which is thus admitted automatically to the brake cylinder is subject to the control of the engineer, since it is dependent upon the train pipe pressure which is under the control of the engineer. It will be evident that if such a differential valve were interposed by itself and without co-operating devices there might be at times a waste of air. Thus, consideration of the structure illustrated and described herein will show that without the auxiliary device which forms a part thereof the sustaining air pressure which passes the differential valve would exhaust into the atmosphere and be wasted when the triple valve is in release position and the brake pressure is exhausted to atmosphere.

It is therefore the object of this invention to provide, in a much simpler construction than that shown in said application, an efficient device for controlling the operation of the differential valve and preventing waste of air pressure under such conditions as those referred to. In accordance with the present invention, therefore, there is combined with a differential valve, such as that referred to, an auxiliary or controlling valve which is subject primarily to the brake cylinder pressure so that it prevents the passage of air through the differential valve when the brake cylinder pressure falls below a predetermined minimum or, when it falls practically to atmospheric pressure only, as when the brakes are released and the brake cylinder pressure is exhausted to atmosphere, and again permits the passage of air through the differential valve when the brake cylinder pressure is again built up to or above the predetermined minimum. It may also be subject to the minimum pressure which is retained by the retaining valve, when it is used, so that if the excess of pressure admitted by the differential valve is greater than the pressure retained by the retaining valve the further passage of air through the differential valve is prevented in order that such surplus, above the pressure retained by the retaining valve, shall not be wasted through the retaining valve.

The invention will be more fully explained hereinafter with reference to the accompanying drawings in which it is illustrated and in which—

Figure 2:
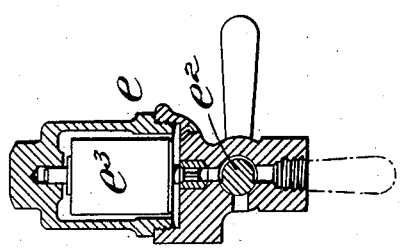

Figure 1 is a diagrammatic or outline view of so much of an ordinary fluid pressure brake system as is necessary to enable the application of the invention to be understood. Fig. 2 is a detail view in section of an automatic retaining valve such as may be employed in connection with the invention, the scale of this figure being larger than that of Fig. 1. Fig. 3 is a detail view, in section, on a still larger scale, of a structure in which the differential valve and the auxiliary or controlling valve are, for convenience, embodied, the controlling valve being shown in this case as a needle valve carried by a plain diaphragm. Fig. 4 is a view similar to Fig. 3 but showing a controlling valve of a slightly different type and carried by a corrugated diaphragm.

The structure shown in Figs. 1 and 2 of the drawings, except with respect to the novel features hereinafter pointed out, is of ordinary construction and comprises a train pipe $a$, a brake cylinder $b$, an auxiliary reservoir $c$, a train pipe connection $a'$ between the train pipe and the triple valve $d$, a brake cylinder connection $b'$ between the triple valve $d$ and the brake cylinder $b$ through the auxiliary reservoir as usual, a retaining valve $e$ and a connection $e'$ from the exhaust of the triple valve to the retaining valve. The retaining valve $e$ is shown as of usual construction, comprising a hand operated valve $e^2$ which may be turned so as to permit the exhaust of the triple valve to communicate directly with the atmosphere or to communicate with the atmosphere under the control of a weighted valve $e^3$, which under operative conditions serves to maintain a predetermined pressure in the brake cylinder. The triple valve $d$ may also be of any ordinary or suitable construction.

In the application of the present invention there is provided between the train pipe and the brake cylinder a connection which is independent of and additional to the connection between the train pipe and the triple valve, and in such connection are interposed a differential valve, which opens when the train pipe pressure exceeds the pressure at which the valve is adjusted to open, and a controlling valve which is subject to the pressure in the brake cylinder and prevents the passage of air through the differential valve when the brake cylinder pressure falls to atmospheric or below a predetermined pressure. For convenience in construction both of these valves may be incorporated in one structure, indicated at $f$ in Fig. 1 and shown in detail, in slightly different forms, in Figs. 3 and 4. This valve structure $f$ is shown as connected on one side, as at $f'$, with the train pipe, and on the other side, as at $f^2$, with the brake cylinder $b$ or with the brake cylinder connection $b'$. It may also have a connection, as at $f^3$, with the retaining valve pipe $e'$ although such connection is not essential.

The structure in which the differential valve and the controlling valve are embodied is shown in detail in Figs. 3 and 4 and as the constructions shown in these two figures are identical except with respect to the form of the controlling valve no distinction will be made in the following description between the two figures except in so far as reference is made to the form of the controlling valve.

The body $g$ of the combined structure, to which the train pipe $f'$ is connected on one side and the brake cylinder pipe $f^2$ is connected on the other side, receives at one end the differential valve $h$ and at the other end the controlling valve $i$. The differential valve $h$ comprises a shell $h'$ in which a valve $h^2$ is seated upon a spring $h^3$, the valve being loose in the shell or provided with an aperture $h^4$ so that the air pressure may be equalized quickly in the valve chamber. The valve body $g$ is formed with an inlet channel $g'$ between the train pipe $f'$ and the valve seat $g^2$ and with a channel $g^4$ between the valve chamber $g^3$ and the choked or restricted passage leading to the valve seat $g^5$ of the controlling valve. The valve chamber $g^6$ of the controlling valve connects through a channel $g^7$ with the outlet or brake cylinder connection $f^2$.

In the construction shown in Fig. 3 the controlling valve $i$ comprises a needle valve $i'$ to coöperate with the valve seat $g^5$, and is carried in an usual plunger $i^2$ by a plain diaphragm $i^3$, the plunger $i^2$ being backed up by a spring $i^4$. In the construction shown in Fig. 4 the valve $i^5$ which coöperates with the valve seat $g^5$ is itself a part of a corrugated diaphragm $i^6$ backed by a plunger $i^7$ and a spring $i^8$. In both cases the valve area exposed to the pressure which passes the differential valve $h$ is very small as compared with the pressure in the valve chamber $g^6$, that is, the brake cylinder pressure which lies against the diaphragm $i^3$ or $i^6$ as the case may be, so that the valve is held tightly to its seat by the spring $i^3$ when the pressure in the valve chamber $g^6$ is small but is moved from its seat by a comparatively small increase in the brake cylinder pressure.

If retaining valves are employed in the brake system it is desirable to connect the retaining valve pipe to the chamber $i^9$ behind the plunger $i^2$ or $i^7$ as the case may be so that the air pressure which is retained by the retaining valve $e$ shall lie against the plunger $i^2$ or $i^7$ and therefore the rear side of the diaphragm $i^3$ or $i^6$, supplementing the action of the spring $i^4$ or $i^8$ and preventing the unseating of the valve $i'$ or $i^5$, while the retaining valve is closed.

In operation the differential valve $h$ opens when the train pipe pressure exceeds the resistance of the spring $h^3$ and permits the excess of pressure to pass the differential valve toward the brake cylinder. If there is no brake cylinder pressure, as is the case when the triple valve is in release or exhaust position, the spring $i^4$ or $i^8$ holds the controlling valve $i'$ or $i^5$ to its seat and prevents the passage of air onward from the differential valve and therefore prevents the waste of air pressure which would otherwise escape through the exhaust. If, however, there is pressure in the brake cylinder, as there will be ordinarily except when the brakes are released, such pressure lying against the diaphragm $i^3$ or $i^6$, holds the controlling valve $i'$ or $i^5$ from its seat and permits the air pressure which passes the differential valve $h$ to pass on to the brake cylinder to maintain the pressure therein. In cases in which a retaining valve, as shown, is employed it is obvious that without the connection of the retaining valve pipe to the chamber back of the controlling valve, the excess of the pressure which passes the differential valve above the pressure which the retaining valve retains would lift the retaining valve from its seat and therefore be wasted; in order to prevent this waste of pressure the retaining valve pipe is connected to the chamber back of the controlling valve so that the retaining valve pressure lying against the rear side of the diaphragm and supplementing the spring, will hold the controlling valve to its seat. If the retaining valve is open the controlling valve acts exactly as it would without any connection of the retaining valve pipe, the chamber back of the diaphragm being then vented to atmosphere.

It will be seen clearly that it is possible for the engineer at all times to determine the pressure which shall be admitted to the brake cylinder for the purpose of maintaining pressure therein, for the excess of pressure which is permitted by the differential valve to pass to the brake cylinder is dependent upon the pressure in the train pipe which is directly under the control of the engineer.

It will be understood that the controlling valve is not necessarily embodied in the same structure with the differential valve, that the retaining valve pipe is not necessarily connected to the chamber back of the controlling valve, and that various changes in details of construction and arrangement to suit different conditions of use may be made without departing from the spirit of the invention.

I claim as my invention:

1. A valve structure for a fluid pressure brake system comprising an inlet adapted to be connected to the train pipe, an outlet adapted to be connected to the brake cylinder, a differential valve subject to the train pipe pressure to be opened thereby, a controlling valve subject to the brake cylinder pressure to be opened thereby, and a channel from the inlet to the outlet controlled both by the differential valve and by the controlling valve.

2. In a fluid pressure brake system, a differential valve interposed in a connection between the train pipe and the brake cylinder and subject to the pressure in the train pipe to be opened thereby and a controlling valve subject to the pressure in the brake cylinder to be opened thereby and subject also to the pressure in the retaining valve pipe to be closed thereby.

3. In a fluid pressure brake system, the combination of a train pipe, a brake cylinder, a connection from the train pipe to the brake cylinder, a differential valve interposed in said connection and subject to the pressure in the train pipe to be opened thereby, a controlling valve subject to the pressure in the brake cylinder to control said differential valve, a retaining valve and pipe and a connection from the retaining valve pipe to the controlling valve to act upon the same in opposition to the brake cylinder pressure.

4. In a fluid pressure brake system, the combination with a train pipe, brake cylinder and retaining valve pipe of a valve structure interposed in a connection from the train pipe to the brake cylinder and comprising a differential valve subject to the pressure in the train pipe to be opened thereby and a controlling valve to control the connection between the train pipe and the brake cylinder and subject to the pressure in the brake cylinder to be opened thereby, and a connection from the retaining valve pipe to said valve structure to permit the pressure in the retaining valve pipe to act upon the controlling valve in opposition to the brake cylinder pressure.

5. In a fluid pressure brake system, a differential valve interposed in a connection between the train pipe and the brake cylinder and subject to the pressure in the train pipe to be opened thereby, a controlling valve subject to the pressure in the brake cylinder to be opened thereby, a retaining valve, and means whereby the controlling valve is closed when the retaining valve is in operative position.

This specification signed and witnessed this 15th day of March A. D., 1911.

WILLIAM H. SAUVAGE.

Signed in the presence of—
ELLA J. KRUGER,
HELEN M. DAMES.